US007287146B2

(12) United States Patent
Inuo et al.

(10) Patent No.: US 7,287,146 B2
(45) Date of Patent: Oct. 23, 2007

(54) ARRAY-TYPE COMPUTER PROCESSOR

(75) Inventors: Takeshi Inuo, Tokyo (JP); Nobuki Kajihara, Tokyo (JP); Takao Toi, Tokyo (JP); Tooru Awashima, Tokyo (JP); Hirokazu Kami, Tokyo (JP); Taro Fujii, Kanagawa (JP); Kenichiro Anjo, Kanagawa (JP); Kouichiro Furuta, Kanagawa (JP); Masato Motomura, Kanagawa (JP)

(73) Assignees: NEC Corporation, Tokyo (JP); NEC Electronics Corporation, Kanagawa (JP)

( * ) Notice: Subject to any disclaimer, the term of this patent is extended or adjusted under 35 U.S.C. 154(b) by 269 days.

(21) Appl. No.: 11/048,071

(22) Filed: Feb. 2, 2005

(65) Prior Publication Data

US 2005/0172102 A1 Aug. 4, 2005

(30) Foreign Application Priority Data

Feb. 3, 2004 (JP) .............................. 2004-026799

(51) Int. Cl.
*G06F 7/00* (2006.01)

(52) U.S. Cl. ..................... 712/10; 712/18; 712/220; 712/245

(58) Field of Classification Search ................ 712/245, 712/232, 220, 18, 228, 10; 326/37; 718/108
See application file for complete search history.

(56) References Cited

U.S. PATENT DOCUMENTS 3,287,703 A * 11/1966 Slotnick ..................... 712/13

4,943,912 A * 7/1990 Aoyama et al. .............. 712/16

(Continued)

FOREIGN PATENT DOCUMENTS

JP 2000-138579 5/2000

(Continued)

OTHER PUBLICATIONS

Author: Stuart Fiske and William J. Dally, Title: "Thread Prioritization: A Thread Scheduling Mechanism for Multiple-Context Parallel Processors", Date: Jan. 1995, Publisher: Proceedings of the First International Symposium on HPCA.*

(Continued)

*Primary Examiner*—Donald Sparks
*Assistant Examiner*—Vincent Lai
(74) *Attorney, Agent, or Firm*—Whitham Curtis Christofferson & Cook, PC

(57) ABSTRACT

An array-type computer processor stops, with a plurality of computer programs held, a state control unit and a data-path unit, upon input of event data for task switching. The array-type computer processor obtains the operation state of the state control unit and the processed data of the data-path unit when stopped, and temporarily holds them for each of a plurality of the computer programs. Upon completion of this, the array-type computer processor reads the operation state and processed data of any other computer program and sets them in the state control unit and data-path unit. Upon completion of this, the array-type computer processor outputs to the state control unit the event data for starting the operation. The state control unit then starts to sequentially transfer the operation state, thereby making it possible to perform the process operations according to a plurality of computer programs in a time-sharing manner.

14 Claims, 7 Drawing Sheets

U.S. PATENT DOCUMENTS

| | | | |
|---|---|---|---|
| 5,559,973 A * | 9/1996 | Gallup et al. | 712/241 |
| 6,697,935 B1 * | 2/2004 | Borkenhagen et al. | 712/228 |
| 7,051,329 B1 * | 5/2006 | Boggs et al. | 718/104 |
| 2001/0018733 A1 * | 8/2001 | Fujii et al. | 712/16 |
| 2003/0061601 A1 * | 3/2003 | Toi et al. | 717/144 |
| 2003/0126404 A1 * | 7/2003 | Anjo et al. | 712/15 |

FOREIGN PATENT DOCUMENTS

| | | |
|---|---|---|
| JP | 2000-224025 | 8/2000 |
| JP | 2000-232162 | 8/2000 |
| JP | 2000-232354 | 8/2000 |
| JP | 2003-076668 | 3/2003 |
| JP | 2003-099409 | 4/2003 |
| JP | 2003-196248 | 7/2003 |

OTHER PUBLICATIONS

Snyder, Lawrence, "Introduction to the Configurable, Highly Parallel Computer", IEEE, pp. 47-56 (Jan. 1992).

* cited by examiner

ARRAY-TYPE COMPUTER PROCESSOR

BACKGROUND OF THE INVENTION

1. Field of the Invention

The present invention relates to an array-type computer processor including a state control unit and a data-path unit that includes a plurality of processor elements and a plurality of switch elements, which are arranged in a matrix.

2. Description of the Related Art

The current processor units that can perform any of various data processes include the products in practical use that are referred to as the so-called CPU (Central Processing Unit) and MPU (Micro Processor Unit).

The data-processing system using such a processor unit stores in the memory device the various object codes, in which a plurality of operation instructions are described, and the various processed data. The processor unit can read in order the operation instructions and processed data from memory device to serially perform a plurality of data processes.

A single processor unit can thus perform various data processes. The data processes, however, need to perform serially in order the plurality of data processes, and for each of the serial data processes, the processor unit needs to read the operation instructions from the memory device, thereby making it hard to perform complicated data processes at high speed.

On the other hand, if only one data process is to be performed, logical circuits may be formed in hardware for performing the data process, without the necessity of the processor unit reading the plurality of operation instructions from the memory device in order to perform serially the plurality of data processes. The complicated data processes can thus be performed at high speed, but performing only one data process.

That is, the data-processing system that can switch between any object codes can perform various data processes, but not at high speed due to the fixed hardware configuration. On the other hand, the logical circuits in hardware can perform the data processes at high speed, but only one data process due to the fixed object code.

To achieve the above-described problems, the applicants invented an array-type computer processor as the processor unit that can change the hardware configuration according to the software. This array-type computer processor includes a number of small-scale processor elements and switch elements arranged in a matrix, and a data-path unit and state control unit provided in parallel.

Each of the plurality of processor elements can perform individually a data process according to each operation instruction that is individually set. Each of the plurality of switch elements can switch control each of the connections between the plurality of processor elements according to the each operation instruction that is individually set.

The array-type computer processor can thus switch the operation instructions of the plurality of processor elements and the plurality of switch elements to change the hardware configuration to perform the various data processes.

A number of small-scale processor elements as hardware can perform simple data processes in parallel so as to perform complicated data processes at high speed as a whole.

For each operation cycle, the state control unit sequentially switches according to the object code the context of the operation instructions for the plurality of processor elements and the plurality of switch elements as described above, so that the array-type computer processor can continuously perform the parallel processes according to the object code (see, for example, Japanese Patent No. 3269526, Japanese application patent laid-open publication No. 2000-138579, Japanese application patent laid-open publication No. 2000-224025, Japanese application patent laid-open publication No. 2000-232354, Japanese application patent laid-open publication No. 2000-232162, Japanese application patent laid-open publication No. 2003-076668, Japanese application patent laid-open publication No. 2003-099409, and "Introduction to the Configurable, Highly Parallel Computer", Lawrence Snyder, Purdue University, "IEEE Computer, vol. 15, No. 1, Jan. 1982, pp 47-56").

A data-processing system is also in practical use that includes the plurality of data-processing devices connected in parallel for sharing the complicated data processes. Such a data-processing system includes a homogeneity-connected type with the plurality of data-processing devices of the same structure connected, and a heterogeneity-connected type with the plurality of data-processing devices of different structures connected.

The homogeneity-connected type of the data-processing system shares one data process in the plurality of data-processing devices of the same structure, thereby allowing for the data process at high parallelism. The heterogeneity-connected type of the data-processing system shares one data process in the plurality of data-processing devices of different types, thereby allowing each data-processing device to perform its special data process. The applicants proposed the heterogeneity-connected type of the data-processing system as described above which includes the combination of the general MPU and the array-type computer processor (see, for example, Japanese application patent laid-open publication 2003-196248).

The array-type computer processor as described above can actually be used after storing data of a computer program of the object code in a program memory, and connecting the program memory to the array-type computer processor via a system bus. The array-type computer processor then obtains data of a computer program from the external program memory, holds the computer program data, and operates according to the held computer program.

The current array-type computer processor has, however, no so-called multitask function, so that it cannot perform process operations according to the plurality of computer programs at a time. To solve this, the multitask function that is realized by conventional general CPU and MPU, for example, may be applied to the array-type computer processor.

The array-type computer processor has, however, a very different hardware structure and operation principle from the general CPU, so that the multitask of the conventional CPU cannot be simply applied to the array-type computer processor. More specifically, the conventional CPU holds in parallel, for example, the plurality of in-process processed data in external high storage capacity RAMs. The conventional CPU thus will not encounter the problem of saving the in-process processed data, even when the process operations according to the plurality of computer programs are performed in a time-sharing and a pseudo-simultaneous manner.

The array-type computer processor, however, distributes and holds the processed data by small volumes in a number of processor elements arranged in a matrix, so that the problem of saving the in-process processed data occurs when switching between the plurality of computer programs. Further, the array-type computer processor can switch the internal condition in a hardware manner according to a set of instruction codes of the computer program, so that the problem occurs of saving the internal condition when switching between the plurality of computer programs.

SUMMARY OF THE INVENTION

The present invention was accomplished in light of the above-described problems, and aims to provide an array-type computer processor which can perform concurrent process operations according to a plurality of computer programs.

An array-type computer processor according to the present invention comprises, a data-path unit, a state control unit, a state-storage means, a context-storage means, an event-input means, an operation-stopping means, a stop-obtaining means, a stop-holding means, a switch-setting means, and a start-output means. The data-path unit comprises a plurality of processor elements and a plurality of switch elements, which are arranged in a matrix. The processor element performs each of the data processes according to an instruction code that is described in a computer program for each of the plurality of operation states that are sequentially transferred. The switch element can switch or control, according to the instruction code, each of the connections between the plurality of the processor elements. The state control unit sequentially transfers, for each operation state, a context of the instruction code for each operation state of the data-path unit, according to the instruction code and a properly inputted event data.

The state-storage means holds the instruction code of the state control unit for each of the plurality of the computer programs. The context-storage means holds the instruction code of the data-path unit for each of the plurality of the computer programs. The event-input means receives an input of event data for task switching. The operation-stopping means stops, upon input of the event data for task switching, the operations of the state control unit and the data-path unit. The stop-obtaining means obtains the operation state of the state control unit when stopped and the processed data of the data-path unit when stopped. The stop-holding means temporarily holds the operation state and the processed data that have been obtained every time for each of the plurality of the computer programs. The switch-setting means reads, upon completion of the temporary holding, from the stop-holding means the operation state and the processed data of any other of the computer programs, and sets the operation state and the processed data in the state control unit and the data-path unit. The start-output means outputs event data for starting the operation to the state control unit, upon completion of the setting data. The state control unit in the array-type computer processor starts, upon input of the event data for starting the operation, to sequentially transfer the operation state, thereby performing in a pseudo-simultaneous manner the process operations according to the plurality of the computer programs.

The various means referred in the present invention may be any means that is provided to realize its function, such as dedicated hardware for providing a predetermined function, a data-processing device being provided with a predetermined function by a computer program, a predetermined function provided in a data-processing device by a computer program, and a combination thereof.

The various means referred in the present invention may not necessarily be individually independent. A plurality of means may be formed as one member, one means may form a part of any other means, a part of one means may overlap with a part of any other means.

The data-processing device referred in the present invention may be any hardware that can read a computer program to perform a corresponding data process, such as hardware including MPU as a main body to which various devices, such as ROM, RAM (Random Access Memory), and I/F (Interface) unit are connected.

The event data referred in the present invention may be the data by which the state control unit and data-path unit communicate various information to each other to perform various operations. The event data includes, for example, a predetermined code by which the data-path unit informs the state control unit of the operation state being transferred to the next stage, a predetermined code by which the state control unit informs the code-obtaining means of the initial condition or the current operation state or the impossible continuation of the operation transfer, and a predetermined code by which the code-obtaining means informs the state control unit of the operation start.

The array-type computer processor according to the present invention performs acts comprising: holding data of the instruction codes of the state control unit and data-path unit of a plurality of the computer programs; stopping, upon input of the event data for task switching, the operations of the state control unit and the data-path unit; obtaining the operation state of the state control unit when stopped and the processed data of the data-path unit when stopped; temporarily holding for each of a plurality of the computer programs the operation state and the processed data that are data obtained; reading data, upon completion of the temporary holding, from the stop-holding means the operation state and the processed data of any other of the computer programs, and setting the operation state and the processed data in the state control unit and the data-path unit; and outputting, upon completion of the setting of, to the state control unit event data for starting the operation, wherein the state control unit starts, upon input of the event data for starting the operation, to sequentially transfer the operation state, thereby making it possible to perform in a pseudo-simultaneous manner the process operations according to the plurality of computer programs.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Configurations of an Embodiment

Figure 1:
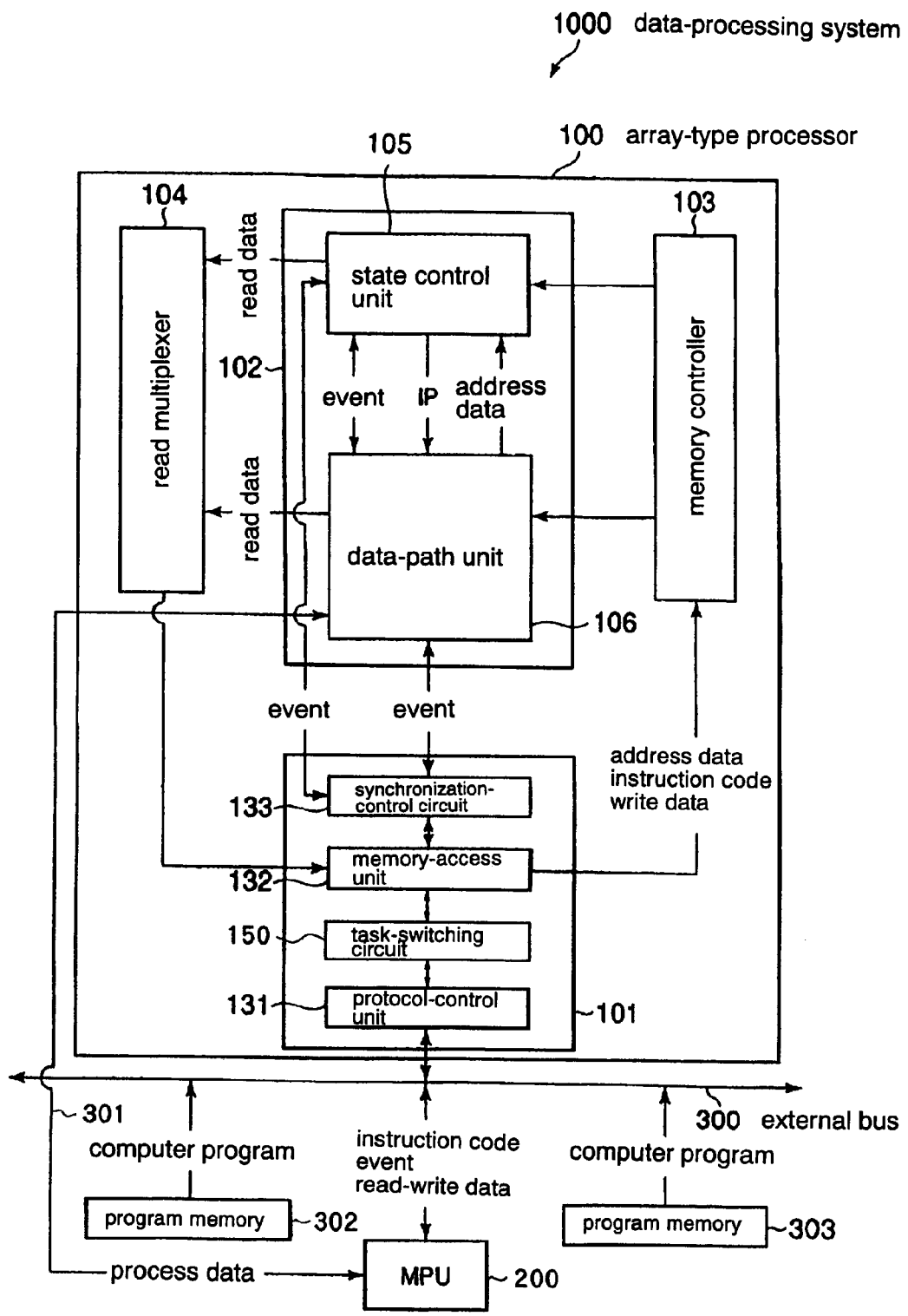
FIG. 1 is a block diagram of a circuit structure of a data-processing system according to an embodiment of the present invention.

One embodiment according to the present invention will be described below with reference to drawings. Data-processing system 1000 in this embodiment includes, as shown in FIG. 1, a plurality of data-processing devices of one array-type computer processor 100 and one MPU 200. These array-type computer processor 100 and MPU 200 connect to each other via external bus 300 and data line 301.

Data-processing system 1000 also includes program memory 302 dedicated for storing a computer program of array-type computer processor 100, and program memory 303 dedicated for storing computer program of MPU 200. These memories connect to external bus 300.

Array-type computer processor 100 reads its own computer program from program memory 302 and performs a data process according to the computer program. At the same time, data-path unit 106 data processes the inputted processed data and output it. Data-path unit 106 generates event data according to the data process.

MPU 200 includes hardware such as I/F circuit, processor core, and internal register (not shown), and operates according to the computer program stored in program memory 303 to logically form various means as various functions, such as data-input means, data-processing means, data-storage means, and data-output means.

The data-input means corresponds to a function where the processor core recognizes the input data of the I/F circuit according to the computer program. The data-input means can input the processed data and event data. The data-processing means corresponds to a function where the processor core performs data processes. The data-processing means can process the inputted processed data according to the computer program and event data.

The data-storage means corresponds to a function where the processor core stores the processed data into the internal register. The data-storage means temporarily stores various data such as processed data. The data-output means corresponds to a function where the processor core controls the data output of I/F circuit. The data-output means outputs the processed data and event data.

Note, however, that MPU 200 in data-processing system 1000 receives the event data and at least part of the processed data from array-type computer processor 100, and generates a new event data according to at least part of the processed data, and outputs at least part of the processed data and the newly generated event data to array-type computer processor 100.

Array-type computer processor 100 includes I/F circuit 101, processor core 102, memory controller 103 as a generation circuit and a virtual-recognition means, read multiplexer 104 as a data-read circuit. Processor core 102 includes, as shown in FIG. 1 and FIG. 3, state control unit 105 and data-path unit 106.

Figure 2A:
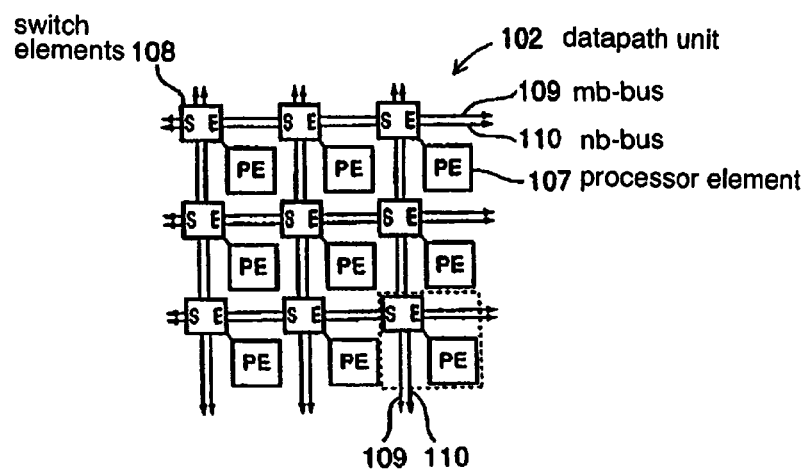
FIG. 2A and FIG. 2B are block diagrams of a circuit structure such as a m/nb bus of array-type computer processor.
Figure 2B:
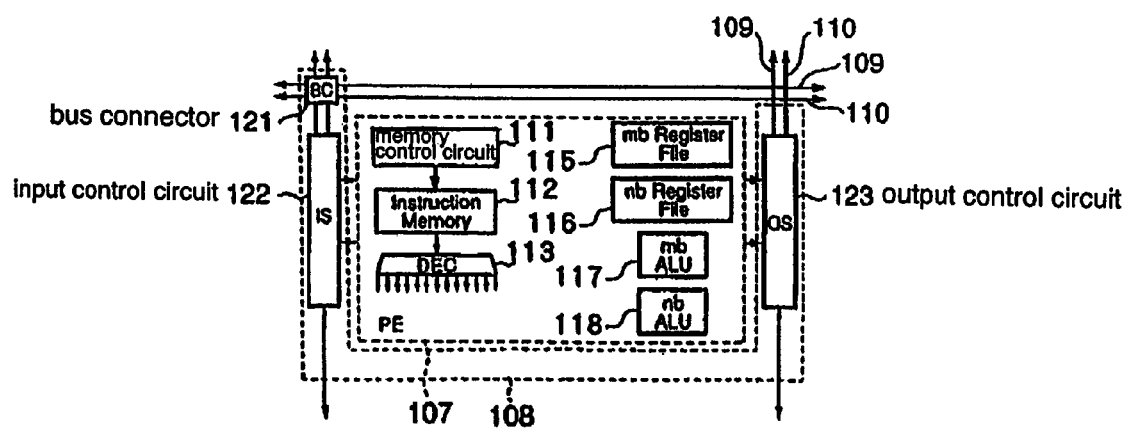
Figure 3:
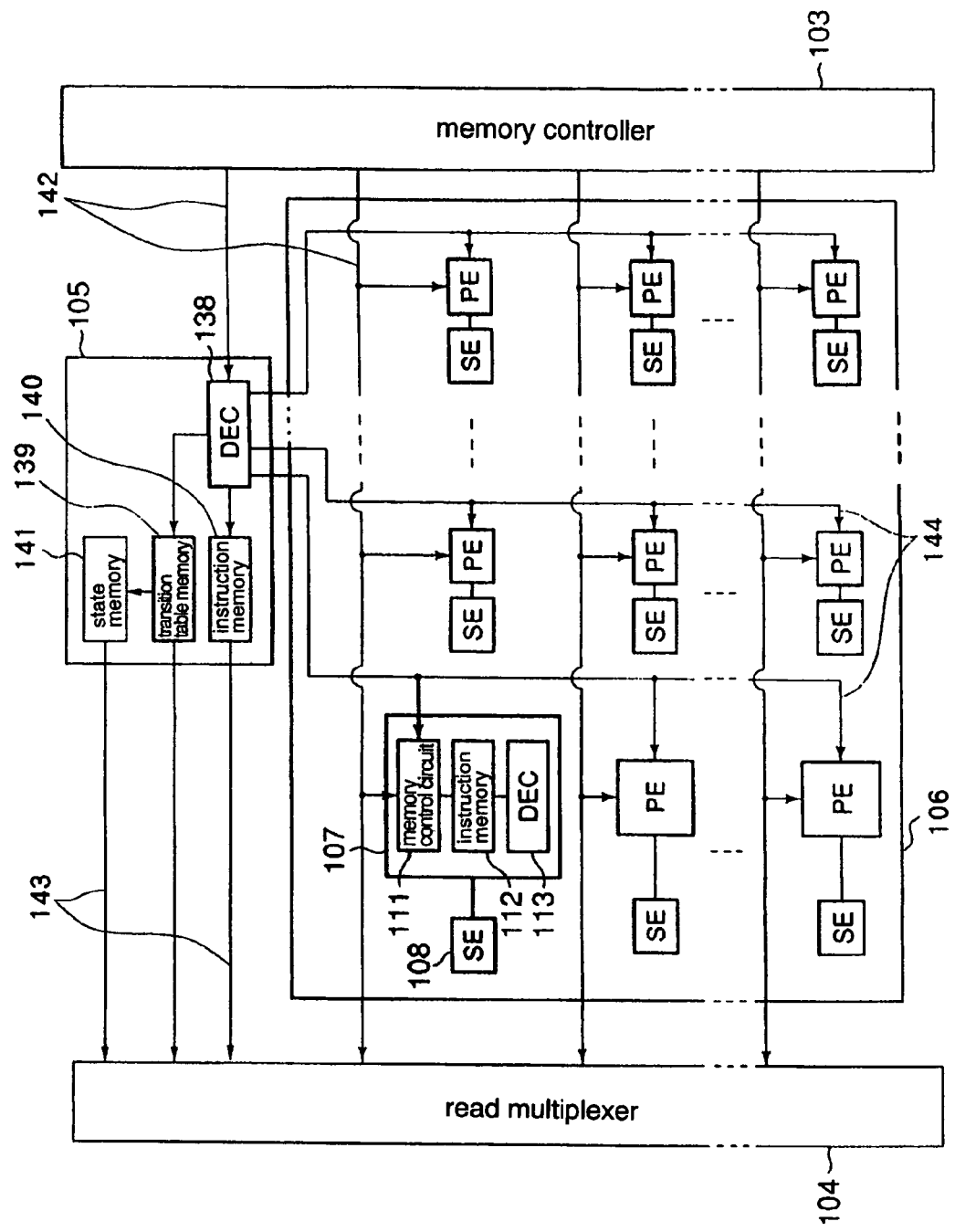
FIG. 3 is a block diagram of a circuit structure such as an instruction bus.

Data-path unit 106 includes, as shown in FIG. 2A, FIG. 2B and FIG. 3, a plurality of processor elements 107, a plurality of switch elements 108, a number of mb (m-bit) buses 109 forming a part of data bus, a number of nb (n-bit) buses 110 forming a part of data bus. A plurality of processor elements 107 and a plurality of switch elements 108 are arranged in a matrix, and connected in a matrix via a number of m/nb buses 109, 110.

As shown in FIG. 2B, processor element 107 includes memory-control circuit 111, instruction memory 112 as a context-storage means, instruction decoder 113, mb register file 115, nb register file 116, mb ALU (Arithmetic and Logical Unit) 117, nb ALU 118, internal variable wiring (not shown). Switch element 108 includes bus connector 121, input-control circuit 122, output-control circuit 123.

I/F unit 101 includes, as shown in FIG. 1, Protocol-control unit 131, task-switching circuit 150, memory-access unit 132, and synchronization-control circuit 133, which are connected in this order.

Protocol-control unit 131 connects to external bus 300. Memory-access unit 132 connects to memory controller 103 and read multiplexer 104. Synchronization-control circuit 133 connects to state control unit 105 and data-path unit 106 in processor core 102.

Protocol-control unit 131 has a data-set bus protocol in common with external bus 300. Protocol-control unit 131 communicates various data with external bus 300 according to the bus protocol and communicates various data with memory-access unit 132 via task-switching circuit 150 in a simpler manner.

Memory-access unit 132 transmits, as shown in FIG. 1, various data that MPU 200 inputs via external bus 300 to Protocol-control unit 131, to memory controller 103, data-path unit 106, and synchronization-control circuit 133. Memory-access unit 132 also outputs various data transmitted from above components via Protocol-control unit 131 and external bus 300 to MPU 200.

Synchronization-control circuit 133 temporarily holds the event data that MPU 200 inputs via external bus 300 to Protocol-control unit 131, and temporarily holds the event data inputted by state control unit 105.

As shown in FIG. 1, MPU 200 inputs the event data to synchronization-control circuit 133 which temporarily holds the event data that is then obtained via data-path unit 106 by state control unit 105. State control unit 105 inputs event data to synchronization-control circuit 133 which temporarily holds the data that is then obtained by MPU 200.

Memory controller 103 transmits various data transmitted by Memory-access unit 132 in I/F unit 101 to state control unit 105 and data-path unit 106 in processor core 102. Read multiplexer 104 reads the held data in state control unit 105 and data-path unit 106 to transmit the data to Memory-access unit 132.

More particularly, as shown in FIG. 3, state control unit 105 includes instruction decoder 138, transition table memory 139, instruction memory 140 as a state-storage means, and state memory 141. Instruction decoder 138 connects via instruction bus 142 to memory controller 103.

Instruction decoder 138 also connects to transient table memory 139 and instruction memory 140. Transient table memory 139 connects to state memory 141.

As mentioned above, read multiplexer 104 reads the held data in state control unit 105 and data-path unit 106. Each of memories 139 to 141 in state control unit 105, thus, connects to read multiplexer 104 via data bus 143. Processor/switch elements 107, 108 in data-path unit 106 connects to read multiplexer 104 via m/nb data bus 109, 110.

Processor elements 107 are also, as shown in FIG. 3, arranged in a matrix with X rows and Y columns (X and Y are natural numbers of "2" or more). Instruction buses 142 in X rows are connected in parallel from memory controller 103 to read multiplexer 104. Instruction bus 142 for each row connects to memory-control circuit 111 in processor element 107 in Y columns.

Further, address buses 144 in Y columns connect to one instruction decoder 138 in state control unit 105. Address bus 144 for each column connects to memory-control circuit 111 in processor element 107 in X rows.

The computer program of array-type computer processor 100, which is stored in program memory 302, is a context in which the instruction codes of a plurality of processor elements 107 and a plurality of switch elements 108 are sequentially switched, elements 107, 108 being arranged in a matrix in data-path unit 106. The instruction codes of state control unit 105 for switching the context for each operation cycle are sequentially-transferred operation states. The relative relations between the plurality of operation states that are sequentially transferred are transition rules.

In state control unit 105, therefore, instruction decoder 138 decodes the computer program that is read from program memory 302, and instruction memory 140 stores instruction code, and transition table memory 139 stores transition rules of a plurality of operation states.

State control unit 105 sequentially transfers the operation state according to the transition rules in transition table memory 139, and generates instruction pointers for the plurality of processor elements 107 and instruction pointers for the plurality of switch elements 108, according to the instruction code in instruction memory 140.

The transition rules temporarily held in transition table memory 139 disclose the current operation state, which is then temporarily held in state memory 141. Further, instruction memory 140 stores the plurality of instruction codes according to the plurality of operation states, so that memory controller 103 transmits the plurality of address data to state control unit 105 accordingly.

Instruction bus 142 transmits to state control unit 105 the instruction codes in which are also encoded and the address of processor element 107 at which the instruction codes are stored. Instruction decoder 138 decodes the address and transmits it to processor element 107 in one column selected from address buses 144 in Y columns.

At the same time, instruction memory 112 in processor element 107 stores an instruction code with memory controller 103 selecting one of instruction buses 142 in X rows and transmitting the instruction code. In this way, the instruction code and address are transmitted to one processor element 107, and then the instruction code is stored in one address space of instruction memory 112 according to the address.

As shown FIG. 2B, switch element 108 shares instruction memory 112 of adjacent processor element 107, so that state control unit 105 supplies a pair of generated instruction pointers of processor element 107 and switch element 108 to instruction memory 112 in corresponding processor element 107.

Instruction memory 112 temporarily holds the instruction codes of processor element 107 and switch element 108, which codes are read from program memory 302, so that instruction codes of processor element 107 and switch element 108 are assigned with the instruction pointers supplied by state control unit 105. Instruction decoder 113 decodes the instruction codes assigned with the instruction pointers, and controls the operations of switch element 108, internal variable wiring, m/nb ALU 117 and 118.

Mb bus 109 transmits mb of "8 (bit)" processed data, and nb bus 110 transmits "1 (bit)" processed data, so that switch element 108 controls the connections between a plurality of processor elements 107 through m/nb buses 109, 110 according to the operation control by instruction decoder 113.

More particularly, switch element 108 has bus connector 121 to which mb buses 109 and nb buses 110 communicate in four directions. Switch element 108 controls the connections between such a plurality of communicated mb buses 109 and the connections between the plurality of communicated nb buses 110.

In array-type computer processor 100, state control unit 105 thus sequentially switches the context of data-path unit 106 for each operation cycle according to a computer program that is set in program memory 302. For each stage, a plurality of processor elements 107 operate in parallel in data processes that can be set individually.

Input-control circuit 122, as shown in FIG. 2 (*b*), controls the connections of the data inputs from mb bus 109 to mb register file 115 and mb ALU 117, and the connections of the data inputs from nb bus 110 to nb register file 116 and nb ALU 118.

Output-control circuit 123 controls the connections of the data inputs from mb register file 115 and mb ALU 117 to mb bus 109, and the connections of the data inputs from nb register file 116 and nb ALU 118 to nb bus 110.

The internal variable wiring of processor element 107 controls the connections between mb register file 115 and mb ALU 117 and the connections between nb register file 116 and nb ALU 118 inside processor element 107, according to the operation control by instruction decoder 113.

Mb register file 115, according to the connection relation controlled by the internal variable wiring, temporarily holds the processed data of mb that is input from mb bus 109, and outputs the data to mb ALU 117. Nb register file 116, according to the connection relation controlled by the internal variable wiring, temporarily holds the processed data of nb that is input from nb bus 110, and outputs the data to nb ALU 118.

Mb ALU 117 performs with mb processed data the data process according to the operation control by instruction decoder 113. Nb ALU 118 performs with nb processed data the data process according to the operation control by instruction decoder 113. The m/nb data process can thus be appropriately performed according to the bit number of the processed data.

The process results in data-path unit 106 are fed back, if desired, to state control unit 105 as event data. State control unit 105, according to the inputted event data, transfers the operation state to the next-stage operation state, and switches the context of data-path unit 106 to the next-stage context.

As described above, array-type computer processor 100 in this embodiment can read the computer program that is stored in program memory 302, and holds the instruction code in state control unit 105 and data-path unit 106, to allow state control unit 105 and data-path unit 106 to operate according to the instruction code.

Note, however, that data-processing system 1000 in this embodiment stores data of a plurality of computer programs of array-type computer processor 100 in program memory 302, and for each of the plurality of computer programs, holds the instruction code in instruction memory 140 and 112 in state control unit 105 and data-path unit 106, respectively.

Array-type computer processor 100 can perform in a time-sharing manner the process operations according to the plurality of computer programs, thereby performing in a pseudo-simultaneous manner the process operations according to the plurality of computer programs. Array-type computer processor 100 in this embodiment thus includes, as shown in FIG. 1, task-switching circuit 150, which can realize a pseudo-parallel process according to the plurality of computer programs.

Figure 4:
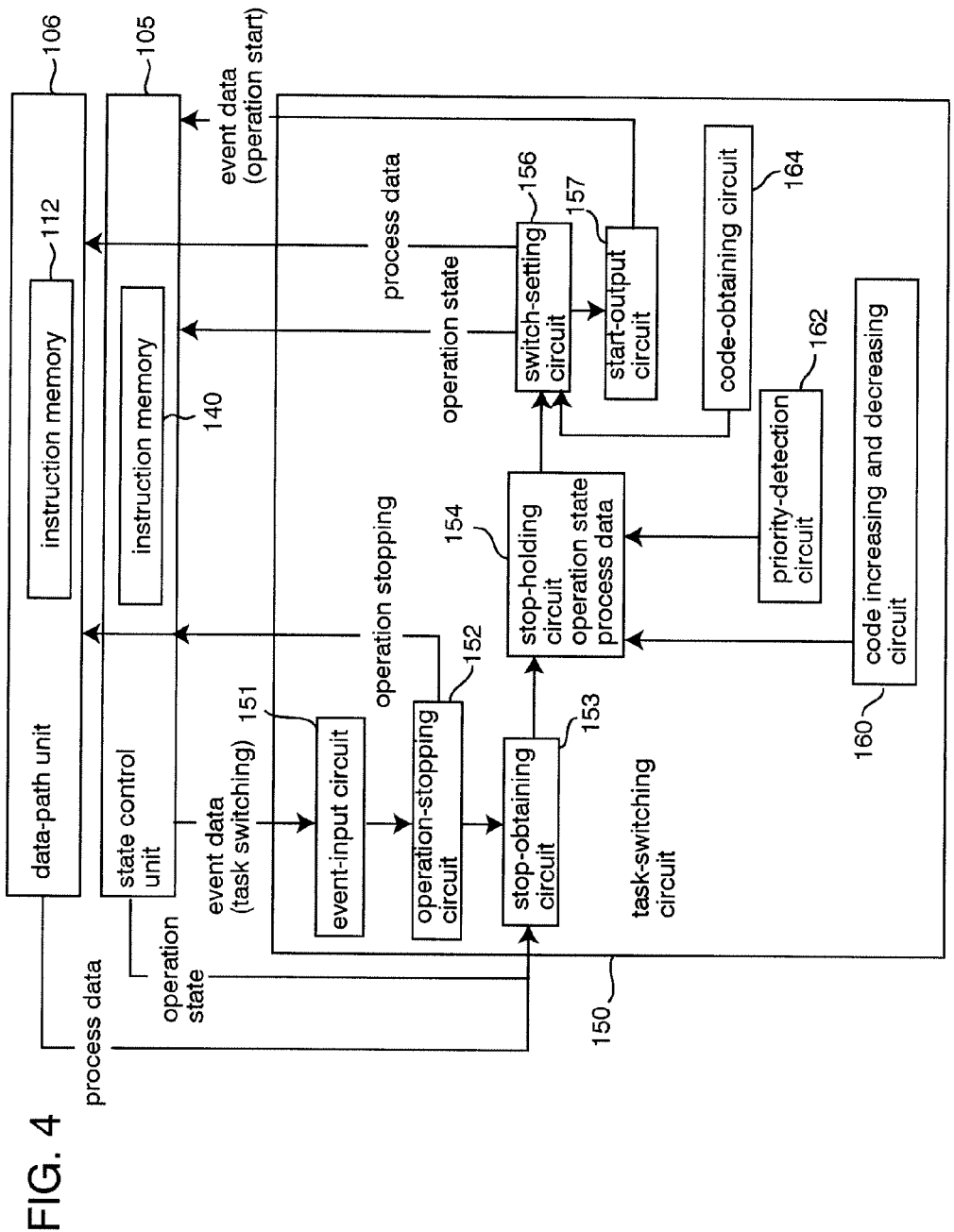
FIG. 4 is a block diagram of a circuit structure of a task-switching circuit.

This task-switching circuit 150 may be an ASIC (Application Specific Integrated Circuit), for example. This task-switching circuit 150 includes, as shown in FIG. 4, hardware such as event-input circuit 151 as a event-input means, operation-stopping circuit 152 as a operation-stopping means, stop-obtaining circuit 153 as a stop-obtaining means, stop-holding circuit 154 as a stop-holding means, switch-setting circuit 156 as a switch-setting means, start-output circuit 157 as a start-output means.

When performing a process operation according to one computer program, state control unit 105 outputs the event data for task switching to event-input circuit 151 in task-switching circuit 150, according to, for example, completed execution of the predetermined step operations. This event-input circuit 151 corresponds to, for example, I/O (Input/Output) port, and receives the event data for task switching that is inputted from state control unit 105.

Operation-stopping circuit 152 stops the operation of state control unit 105 and data-path unit 106, when the event data for task switching is inputted into event-input circuit 151. After stopping by operation-stopping circuit 152, stop-obtaining circuit 153 obtains the operation state of state control unit 105 and the processed data of data-path unit 106.

More specifically, state control unit 105 has a function to stop the operation of data-path unit 106 and also a function to stop its own operation with a dedicated signal input. Operation-stopping circuit 152 thus uses the above functions to stop the operations of state control unit 105 and data-path unit 106.

The current operation state that is temporarily held in state memory 141 in state control unit 105, and the processed data that is temporarily held in m/nb register file 115, 116 in data-path unit 106 can be read from the external, even when state control unit 105 and data-path unit 106 are stopped. This allows stop obtaining circuit 153 to obtain the operation state and processed data.

Stop-holding circuit 154 is, for example, a memory circuit such as RAM. Stop-holding circuit 154 temporarily holds for each of the plurality of computer programs the operation state and processed data that are data obtained by stop-obtaining circuit 153. After stop-holding circuit 154 completes the temporary hold, switch-setting circuit 156 can read the operation state and processed data of any other computer program from stop-holding circuit 154, and then set them in state control unit 105 and data-path unit 106. After switch-setting circuit 156 completes the setting, start-output circuit 157 outputs to state control unit 105 the event data for the operation start.

This state control unit 105, if the event data for the operation start is input after the operation state is set, as described above, reads the context from the computer program according to the operation state that is set, and sets data of the context in data-path unit 106, and then starts to sequentially transfer the operation state.

For ease of illustration, FIG. 4 shows task-switching circuit 150 having state control unit 105, data-path unit 106, and program memory 302 that directly connect to task-switching circuit 150. As shown in FIG. 1, however, task-switching circuit 150 actually connects to state control unit 105 and data-path unit 106 via Memory-access unit 132, and also connects to program memory 302 via Protocol-control unit 131. Task-switching circuit 150 thus communicates with each part as described above actually via Memory-access unit 132 and Protocol-control unit 131.

Operations of an Embodiment

In the above-described configurations of data-processing system 1000 in this embodiment, MPU 200 acts as a main processor and array-type computer processor 100 acts as a coprocessor, so that array-type computer processor 100 data and MPU 200 can data process cooperatively.

Array-type computer processor 100 and MPU 200 can read their own computer programs from program memories 302 and 303, and perform corresponding process operations to perform data processes using the processed data inputted via data line 301.

After the data processes are performed, array-type computer processor 100 and MPU 200 output the processed data to data line 301.

The computer program of array-type computer processor 100 is described as a context in which the instruction codes of a plurality of processor elements 107 and a plurality of switch elements 108 are sequentially switched. The computer program of array-type computer processor 100 is also described as an operation state in which the instruction code of state control unit 105 sequentially transfers to switch the context for each operation cycle.

In array-type computer processor 100 that operates according to such a computer program, state control unit 105 sequentially transfers the operation state, and sequentially transfers the context of data-path unit 106 for each operation cycle. For each operation cycle, thus, a plurality of processor elements 107 operate in parallel in individually settable data processes and a plurality of switch elements 108 switch control the connections between the plurality of processor elements 107.

In this case, the process results in data-path unit 106 are fed back, if required, to state control unit 105 as the event data. State control unit 105 thus transfers, according to the inputted event data, the operation state to the next-stage operation state, and switches the context of data-path unit 106 to the next-stage context.

As described above, array-type computer processor 100 in this embodiment can read the instruction code from program memory 302, and temporarily holds the instruction code in state control unit 105 and data-path unit 106, to allow state control unit 105 and data-path unit 106 to operate according to the instruction code.

Note, however, that in data-processing system 1000 in this embodiment, program memory 302 stores a plurality of computer programs, and array-type computer processor 100 data reads and data holds the plurality of computer programs. Array-type computer processor 100 also switches and performs in a time-sharing manner the process operations according to the plurality of computer programs, thereby performing in a pseudo-simultaneous manner the process operations according to the plurality of computer programs.

More specifically, when performing a process operation according to one computer program, state control unit 105 outputs the event data for task switching to event-input circuit 151 in task-switching circuit 150, according to, for example, completed execution of the predetermined step operations.

In task-switching circuit 150, operation-stopping circuit 152 stops the operation of state control unit 105 and data-path unit 106, when the event data for task switching is inputted into event-input circuit 151. Stop obtaining circuit 153 then obtains the operation state of stopped state control unit 105 and the processed data of stopped data-path unit 106. Stop-holding circuit 154 temporarily holds for each of the plurality of computer programs the operation state and processed data that are obtained.

After the temporary holding is complete, switch-setting circuit 156 reads the operation state and processed data of any other computer program from stop-holding circuit 154 and then sets data of them in state control unit 105 and data-path unit 106. After the setting of this operation state and processed data is complete, start-output circuit 157 outputs to state control unit 105 the event data for starting the operation.

State control unit 105 then reads a context from the computer program according to the operation state that is set, and sets data of the context in data-path unit 106. After the setting of this data in the data-path unit 106 is complete, state control unit 105 starts to sequentially transfer the operation state, and data-path unit 106 then performs the data process according to the context and processed data that are set.

Effects of the Embodiment

Array-type computer processor 100 in this embodiment performs in a time-sharing manner the process operations according to the plurality of computer programs, thereby performing in a pseudo-simultaneous manner the process operations according to the plurality of computer programs.

Modified Examples of the Embodiment

The present invention is not limited to the embodiments described above, and various changes can be made without departing from the spirit and scope thereof. For example, the above-described embodiments illustrate data-processing system 1000 including array-type computer processor 100, MPU 200, and program memories 302 and 303, which are connected via external bus 300. Also possible, however, are data-processing system including only array-type computer processor 100 and program memory 302, and a single array-type computer processor 100 including a plurality of computer program previously mounted (both not shown).

The above-described embodiments also illustrate task-switching circuit 150 that intervenes between Protocol-control unit 131 and Memory-access unit 132. This task-switching circuit 150 can, however, reside at various positions where its functions can be realized. The above-described embodiment also illustrate task-switching circuit 150 that has hardware of various means provided as various circuits 151 to 157. For example, however, the combination of the microprocessor and software can provide some or all of the circuits in task-switching circuit 150.

MPU 200 with software can also provide some or all of various circuits 151 to 157 in task-switching circuit 150. MPU 200 provides the function of task-switching circuit 150 at lower speed, but can provide the function of task-switching circuit 150 according to the computer program of MPU 200 that is stored in program memory 303, so that MPU 200 can easily provide the function without any change of the structure of array-type computer processor 100.

For example, MPU 200 can provide all functions of task-switching circuit 150 according to the computer program that is stored in program memory 303 as the computer program for allowing MPU 200 to perform such as receiving the event data for task switching that is input by state control unit 105 in array-type computer processor 100, stopping the operation of state control unit 105 and data-path unit 106 accordingly, obtaining the operation state of stopped state control unit 105 and the processed data of stopped data-path unit 106, temporarily holding the obtained operation state and processed data for each of the plurality of computer programs, upon completion of the temporary hold, reading data of the operation state and processed data of other computer programs and setting data of them in state control unit 105 and data-path unit 106, upon completion of the setting data of, and allowing start-output circuit 157 to output to state control unit 105 the event data for starting the operation.

A dedicated circuit such as ASIC (not shown) that connects to array-type computer processor 100 via external bus 300 can also provide some or all functions of various circuits 151 to 157 in task-switching circuit 150. Such a dedicated circuit can also be integrated with program memory 302 of array-type computer processor 100 (not shown).

Although the above-described embodiments illustrate state control unit 105 that generates the event data for task switching, data-path unit 106 or MPU 200 can also generate such event data for task switching. For example, task-switching circuit 150 can include a dedicated timer circuit that generates the event data for task switching at each time a predetermined time has passed after the task-switching is performed (not shown).

The above-described embodiments illustrate array-type computer processor 100 that holds all of the instruction codes of the plurality of computer programs that are stored in program memory 302. Array-type computer processor 100 can, however, hold only a portion of the instruction codes of the plurality of computer programs that are stored in program memory 302. In this case, array-type computer processor 100 temporarily holds only a set of instruction codes necessary for the process operation, and reads or obtains the subsequent set of instruction codes from program memory 302 at a required timing.

More specifically, array-type computer processor 100 has instruction code obtaining means that obtains a portion of the instruction codes of the plurality of computer programs, as described above, by providing circuits in task-switching circuit 150 such as a condition-obtaining circuit as a condition-obtaining means, an operation-obtaining circuit as an operation-obtaining means, a context-detection circuit as a context-detection means, a context-obtaining circuit as a context-obtaining means, a code-setting circuit as a code-setting means, relation generation circuit as a relation-generation means, a relation-setting circuit as a relation-setting means, a duplication-detection circuit as a duplication-detection means, and a update-control circuit as a update-control means (not shown).

In this case, if state control unit 105 detects the initial condition that temporarily holds no instruction codes, or the operation completion with a predetermined number of instruction codes temporarily held, state control unit 105 then outputs the event data for impossible continuation to event-input circuit 151 in task-switching circuit 150. The condition-obtaining circuit, when event-input circuit 151 receives the event data for impossible continuation, then obtains data of the current operation state from state memory 141 in state control unit 105, and obtains from data-path unit 106 the event data assigning the next-stage operation state.

The operation-obtaining circuit, according to the operation state and event data that are obtained by the condition-obtaining circuit, obtains a predetermined number of instruction codes of subsequent operation states with a predetermined algorithm from program memory 302. That is, array-type computer processor 100 in this embodiment operates with state control unit 105 that transfers the operation state to the next-stage operation state, and transfers the context of data-path unit 106 to the next-stage context, as described above. In this case, data-path unit 106 performs the data process with the context that is set, and then outputs to state control unit 105 the event data assigning the next-stage operation state to transfer to the next-stage context.

According to the input event data, state control unit 105 then transfers its own operation state to the next-stage condition, and transfers the context of data-path unit 106 to the next-stage context. Thus, when array-type computer processor 100 stops its operation and the current operation state of state control unit 105 and the event data for data-path unit 106 are obtained, the next-stage operation state is disclosed.

Figure 5C:
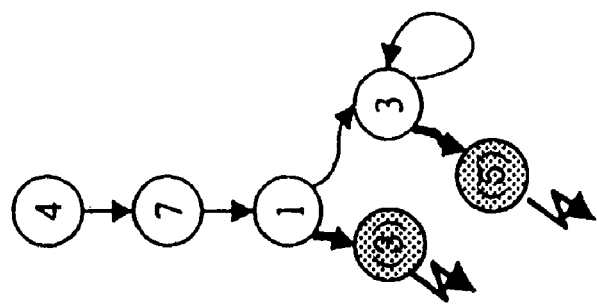
FIG. 5A and FIG. 5B and FIG. 5C are schematic views of a logical structure of a computer program.
Figure 5B:
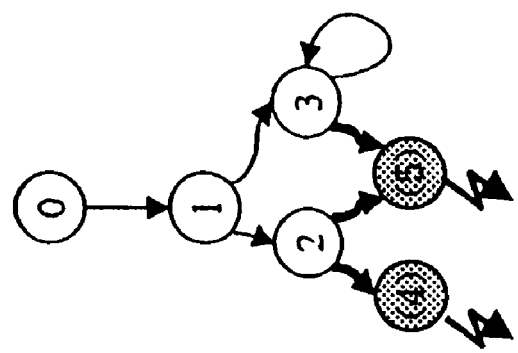
Figure 5A:
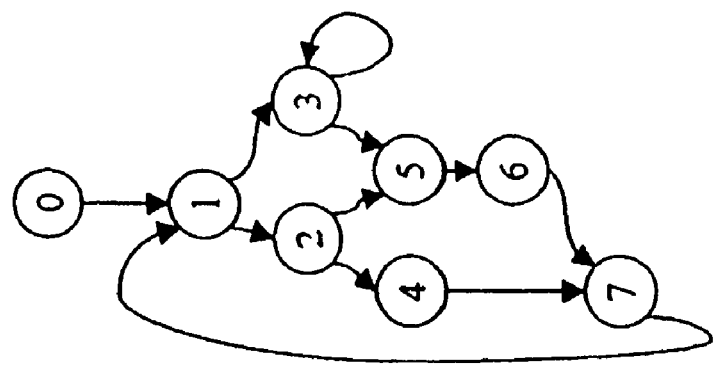

For example, as shown in FIG. 5A, suppose that the computer program of array-type computer processor 100 includes instruction codes of eight conditions and contexts "0 to 7", and that instruction memories 141 and 112 of state control unit 105 and data-path unit 106 can only temporarily hold four instruction codes.

At the initial condition shortly after the power supply is turned on for array-type computer processor 100, state memory 141 of state control unit 105 holds, of course, no current operation states, so that the condition-obtaining circuit detects the operation state that is not held.

The operation-obtaining circuit then automatically obtains a set of four instruction codes from "0" from program memory 302. In this case, as shown in FIG. 5A, the four instruction codes can be obtained in a pattern of "0→1→(2, 3)", as well as in a pattern of "0→1→2→4", "0→1→2→5", and "0→1→3→5." The operation-obtaining circuit obtains the instruction codes in a proper pattern with a well-known algorithm such as breadth first search, for example.

The context-detection circuit data detects a predetermined number of contexts according to the operation states of instruction codes that are obtained by the operation-obtaining circuit. The context-obtaining circuit obtains the instruction codes of the contexts that are detected by the context-detection circuit from program memory 302.

The code-setting circuit sets the instruction codes of the operation state and context that have been obtained by the context-obtaining circuit and operation-obtaining circuit in state control unit 105 and data-path unit 106. Start output circuit 157 outputs, after the code-setting circuit completes the setting of the instruction codes, to state control unit 105 the event data for starting the operation.

The relation-generation circuit data generates the correspondence relation between the context that is detected by the context-detection circuit and the operation state. The relation-setting circuit sets the correspondence relation that is generated by the relation-generation circuit in state control unit 105. That is, instruction memory 112 in processor element 107 temporarily holds the instruction code for each of the plurality of contexts, and the instruction code and memory address can have any relationship between them.

Because state control unit 105 assigns the instruction code of the context with the memory address in instruction memory 112. The relation-generation circuit data generates the correspondence relation between the context and operation state, which is necessary for the assignment, and the relation-setting circuit sets the relation in state control unit 105.

State control unit 105, when the event data for starting the operation is input, starts to sequentially transfer the operation state according to the instruction code and transition rule that are stored, and sequentially transfers the context of data-path unit 106 for each operation state that is sequentially transferred according to the correspondence relation that data have been set.

The duplication-detection circuit detects the duplication between the plurality of contexts that are detected the last time and the plurality of contexts that are detected this time by the context-detection circuit. The update-control circuit eliminates the obtaining data from program memory 302 by the context-obtaining circuit, and the setting data in data-path unit 106 by the code-setting circuit, for the instruction codes of the duplicated contexts detected by the duplication-detection circuit.

For example, the four contexts of "0→1→(2, 3)" at the last time, as shown in FIG. 5B, and the four contexts of "4→7→1→3" at this time, as shown in FIG. 5C, have two contexts duplicated between them. When the duplication-detection circuit detects such context duplication, the update-control circuit operation controls the context-obtaining circuit and code-setting circuit to prevent the obtaining and setting data of the instruction codes.

In the above-described configuration of array-type computer processor 100, task-switching circuit 150 in I/F unit 101 obtains e instruction codes of a predetermined number of the cooperative portion of the operation states along with the instruction codes of the corresponding partial contexts from program memory 302, so that state control unit 105 operates with temporarily holding only the instruction codes of a predetermined number of operation states that data have been obtained, and data-path unit 106 operates with temporarily holding only the instruction codes of a predetermined number of contexts that have been obtained.

Every time state control unit 105 and data-path unit 106 complete their operations with the temporarily-held instruction codes, task-switching circuit 150 obtains data of the instruction codes of subsequent operation states and contexts, so that array-type computer processor 100 can perform the set of operations even if it can only hold a portion of the instruction codes of the computer program.

In the above-described array-type computer processor 100, every time state control unit 105 and data-path unit 106 stop their operations with the data-set instruction codes, task-switching circuit 150 continues the operation as described above, so that even if state control unit 105 and data-path unit 106 can only hold a portion of a number of instruction codes of the computer program, a set of process operations corresponding to the computer program can be performed.

Furthermore, when task-switching circuit 150 only updates the instruction codes of a predetermined number of operation states and contexts, duplication is detected between the plurality of the last time contexts and the plurality of the present time contexts, and the obtaining data from program memory 302 and the setting data in data-path unit 106 are eliminated for the instruction codes of the duplication-detected contexts. The instruction codes can thus be updated with less process burden and required time, thereby providing lower power consumption and higher process speed of array-type computer processor 100.

Further, as described above, task-switching circuit 150 as hardware is arranged to realize the process operation for obtaining data of portion of a set of a number of instruction codes concurrently from program memory 302 and setting their data in state control unit 105 and data-path unit 106, so that the above-described operations can be performed alone at high speed.

The combination of the micro-processor and computer program can provide, of course, some or all of the above-described various circuits, and so can external MPU 200 and dedicated circuits.

The above-described array-type computer processor 100 can concurrently obtain a portion of the instruction codes of the computer program to perform the process operation, along with switch setting a plurality of computer programs in a time-sharing manner, thereby properly combining these operations to increase the overall operation efficiency.

For example, if a computer program "A" includes contexts and operation states of "a1 to a4", a computer program "B" includes contexts and operation states of "b1 to b4", and instruction memories 140 and 112 in state control unit 105 and data-path unit 106 each temporarily hold concurrently four operation states and four contexts, instruction memories 140 and 112 first temporarily hold "a1 and a2" for the process operations of state control unit 105 and data-path unit 106.

In running of "a1 and a2", the free space of instruction memories 140 and 112 temporarily hold "b1 and b2". After running of "a1 and a2" is complete, running of "b1 and b2" starts. In running of "b1 and b2", "a1 and a2" in instruction memories 140 and 112 are updated to "a3 and a4". After running of "b1 and b2" is complete, running of "a3 and a4" starts.

In running of "a3 and a4", "b1 and b2" in instruction memory 140 and 112 are updated to "b3 and b4". After running of "a3 and a4" is complete, running of "b3 and b4" starts. In this way, array-type computer processor 100 can perform in a time-sharing manner the process operations in a plurality of computer programs, thereby performing the process operations of the plurality of computer programs at overall high efficiency.

Additionally, array-type computer processor 100 can concurrently obtain a portion of the instruction codes of a plurality of computer programs to perform the process operations as described above, also with priorities set for the plurality of computer programs. More specifically, in the above-described case, task-switching circuit 150 includes a priority-detection circuit as a priority-detection means, and a code-increasing-and-decreasing circuit as a code-increasing-and-decreasing means (not shown).

The priority-detection circuit accumulates the frequency of use, which becomes the computer program priority for each portion of the instruction codes of the plurality of computer programs that is temporarily held in instruction memory 140 and instruction memory 112, to detect the priority for the plurality of computer programs of which only a portion of the instruction codes are temporarily held by instruction memory 140 and instruction memory 112.

The code-increasing-and-decreasing circuit preferentially deletes the instruction code with a lower frequency of use, for example, by increasing and decreasing among a plurality of computer programs according to the priorities the number of the instruction codes only a portion of which are temporarily held in instruction memory 140 and instruction memory 112.

If, for example, computer programs "A" and "B" are given, and instruction memories 140 and 112 in state control unit 105 and data-path unit 106 each temporarily hold, concurrently, four operation states and four contexts, as described above, instruction memory 140 and 112 can each temporarily hold three contexts and three operation states of computer program "A" and temporarily hold one context and one operation state of "B", according to the priority. In this way, array-type computer processor 100 can run a plurality of computer programs in parallel at still higher efficiency.

As illustrated in the above-described example, task-switching circuit 150 data updates the instruction codes of state control unit 105 and data-path unit 106, by omitting the obtaining and setting data of the instruction codes of the duplicated contexts between the last time and a present time. All instruction codes can also be updated each time, however, without detecting duplication or omitting process operation.

This case cannot provide less process burden or required time for the update of the instruction code. This case can, however, eliminate the detection of the duplicated instruction codes and the control of omitting operations, thereby eliminating the formation of the duplication-detection circuit and update-control circuit to reduce the process burden and required time for the formation.

That is, if a number of duplications are expected to occur in instruction codes, a predetermined number of which are concurrently updated, the duplication-detection circuit and update-control circuit are preferably provided. If few such duplications are expected to, no duplication-detection circuits or update-control circuits are preferably provided.

As illustrated in the above-described example, the context can be updated with less process burden and required time, by providing duplication-detection circuit and update-control circuit in task-switching circuit 150 to detect only the duplicated contexts between a present time and the last time to omit the obtaining and setting data of the instruction codes.

Task-switching circuit 150 can include, however, an update-storage means for registering the various update techniques of the context and the update cost. A technique-detection means for detecting detect the update technique for the least total update cost from the combination of the plurality of the last time contexts and the plurality of the present time contexts (both means are not shown), to allow the context of data-path unit 106 to be updated with update technique that is detected in the code-setting circuit by the operation control of the update-control circuit.

The above-described update-storage means can be provided, for example, by a memory circuit that stores data of the various update techniques as computer programs. The technique-detection means can be provided, for example, by a micro-processor that reads predetermined computer programs from the memory circuit according to the mounted computer programs and performs the process operations (both are not shown).

The first update technique can be a technique in which, for example, the context-obtaining circuit obtains data of only different instruction codes between the last time and the present time contexts, and the code-setting circuit sets data of only the difference between the present time and the last time instruction codes. If there is a plurality of different instruction codes between the last time and the present time contexts, the above update technique can also select a combination of the contexts for the least total update cost of the difference.

The second update technique can be a technique in which, for the predetermined combination of the last time and present time contexts, the last time context in data-path unit 106 is initialized, and then the present time context in the code-setting circuit is set.

The third update technique can be a technique in which in the predetermined combination of the plurality of the last time and present time contexts, the corresponding context at the last time is overwritten with any other context at the last time, and the context-obtaining circuit obtains data of only the instruction codes different from those of the present time context and the code-setting circuit sets data of the different instruction codes.

More specifically, for the four contexts of "0→1→(2, 3)" at the last time, as shown in FIG. 5B, and the four contexts of "4→7→1→3" at the present time, as shown in FIG. 5C, the duplicated two contexts of "1 and 3" are not updated, and the contexts of "0 and 2" are updated to the contexts of "4 and 7".

The context includes, however, the instruction codes of processor elements 107 of a matrix with X rows and Y columns, so that the context of "0" and the context of "4", for example, may have common instruction codes in most processor elements 107. In this case, the first update technique can be used to obtain and store only the difference instruction codes to reduce its process burden and increase the operation speed, to update the context of "0" to the context of "4".

If, as described above, the context of "0, 2" is updated to the context of "4, 7" only by the difference instruction code, the total update costs can be compared between the "0→4, 2→7" and "0→7, 2→4" to select a lower-cost update to further reduce the process burden and increase the operation speed.

If the context of "0" is data updated to the context of "4" as described above, the context of "0" can set the instruction codes in all of the processor elements 107 of a matrix with X rows and Y columns. But the context of "4" may only set the instruction codes in a portion of the processor elements 107 of a matrix with X rows and Y columns.

In this case, however, the processor elements 107 in which the instruction codes are not set with this-time context of "4" will hold the last-time instruction codes, which need to be initialized. The instruction codes are initialized, as in the case where the instruction codes are stored, by serially selecting and performing at a time one of processor elements 107 of a matrix with X rows and Y columns, so that the update cost is the same as in the case where the instruction codes are stored.

The instruction codes of all processor elements 107 of a matrix with X rows and Y columns can then be formed to be initialized concurrently, so that the second update technique can be used to initialize the context of "0" and then to newly store the context of "4", thereby reducing the update cost.

When the context of "0" in "0→1→(2, 3)" is updated to the context of "4" in "4→7→1→3", most instruction codes may be different between "0" and "4", for example, and most instruction codes may be common between "1" that is not updated and "4" that is updated.

In such a case, the context of "1" in "0→1→(2, 3)" is overwritten on the context of "0" at a time, and then the context of "1" is updated to the context of "4" only with their difference instruction codes, thereby making it possible to reduce its process burden and increase the operation speed.

Existing array-type computer processor 100 does not have a function of overwriting the held contexts to other contexts concurrently described above. The instruction codes are initialized, as in the case where the instruction codes are stored, by serially selecting and performing at a time one of processor elements 107 of a matrix with X rows and Y columns, so that initializing all processor elements 107 in data updating the contexts as described above may increase the update cost.

The update cost thus needs to be reduced by the above-described update techniques using a function of initializing the instruction codes of processor elements 107 of a matrix with X rows and Y columns concurrently, and a function of overwriting the held contexts to other contexts concurrently. A specific description is given below of the hardware structure for initializing and overwriting the contexts easily and quickly.

Figure 6:
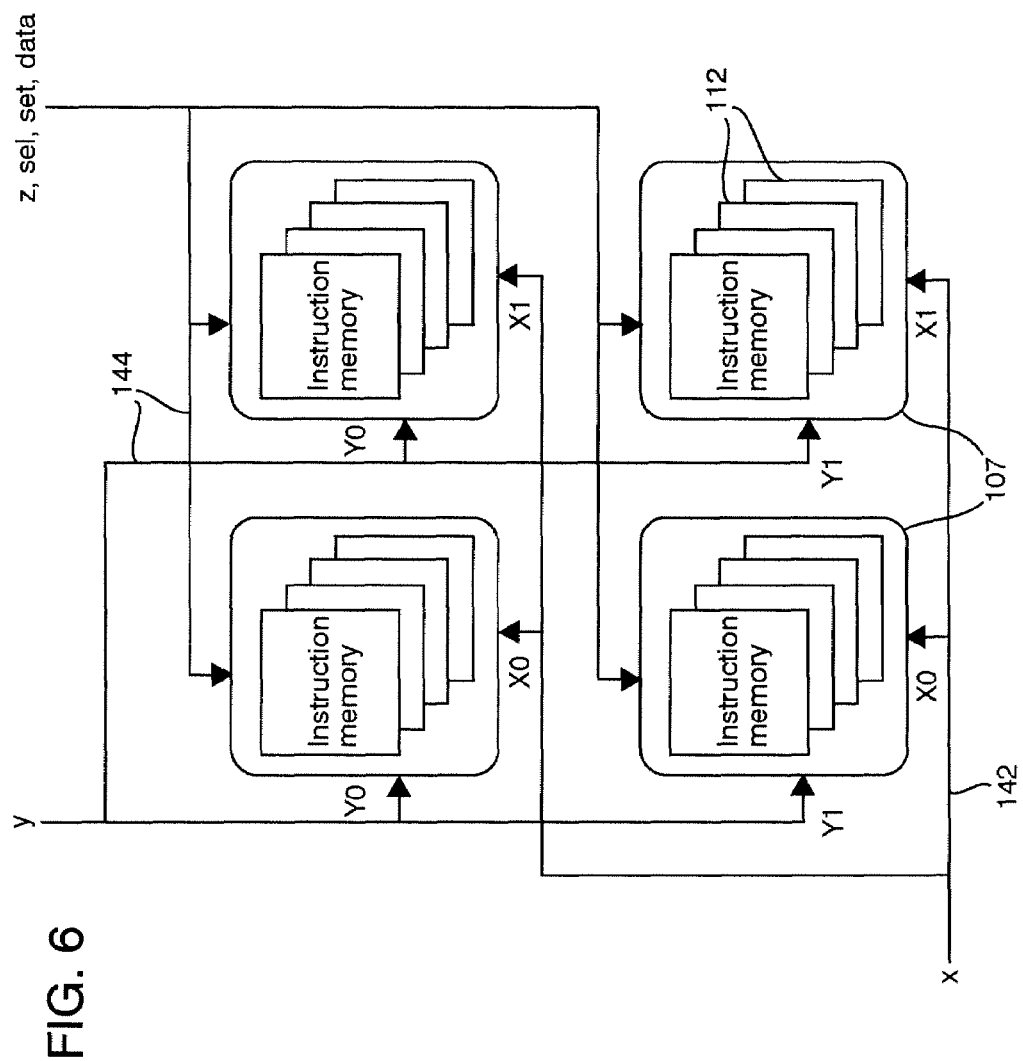
FIG. 6 is a schematic view of a substantial part of an array-type computer processor of a modified example.

As shown in FIG. 6, instruction memory 112 in processor element 107 is provided in a multistage structure with Z layers (Z is a natural number of "2" or more) each layer of which data holds the instruction code of each context. The address data "z" of the Z layer is also set at the instruction code that is decoded by instruction decoder 138 in state control unit 105.

State control unit 105 is arranged to also generate a set signal "set" for disabling the address data that selects at a time one of processor elements 107 of a matrix with X rows and Y columns, and concurrently selecting all of processor elements 107 of a matrix with X rows and Y columns. A select signal "sel" selects one of the contexts that are temporarily held in data-path unit 106 as the instruction codes.

Figure 7:
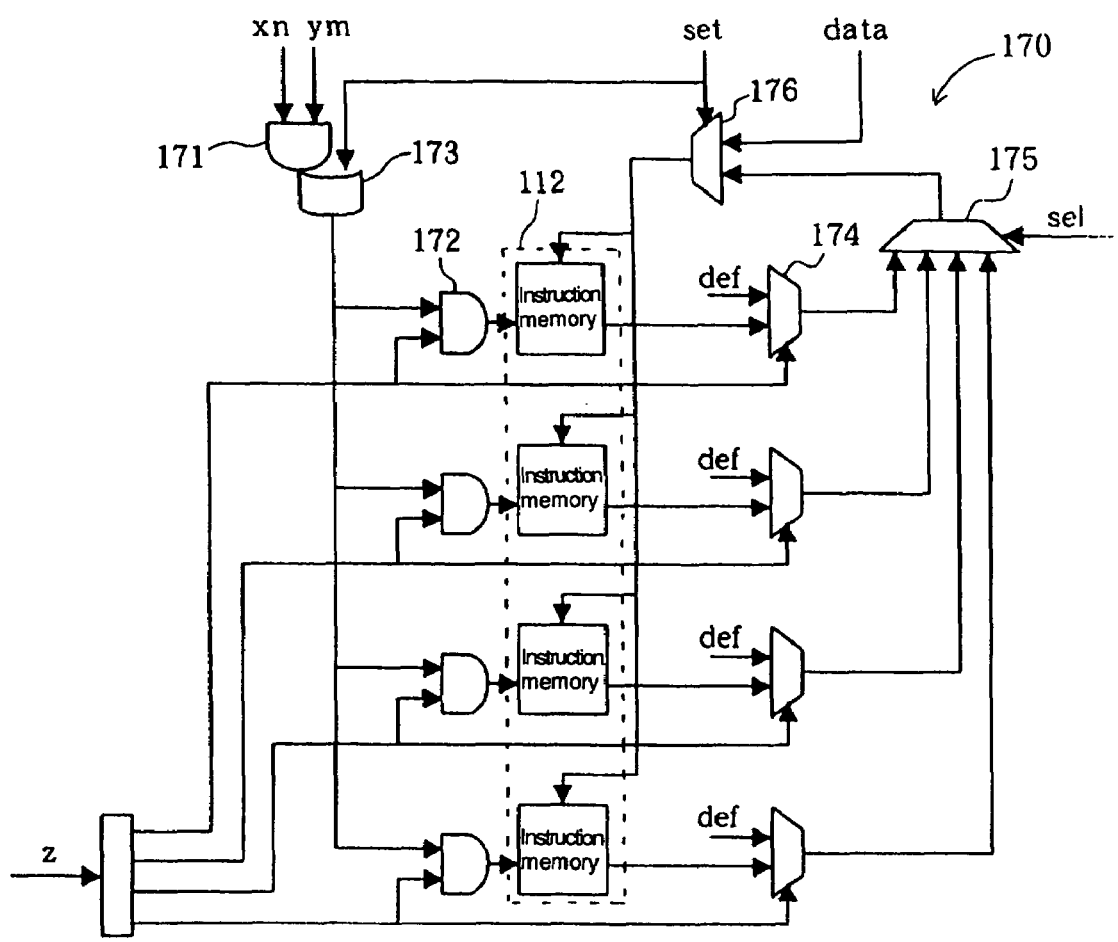
FIG. 7 is a block diagram of an internal circuit of a processor element.

As shown in FIG. 7, setting-all circuit 170 as the code-initializing means and code-overwriting means is then provided in each processor element 107, and setting-all circuit 170 is connected to each layer of instruction memory 112.

Setting-all circuit 170 comprises logical circuits including such as AND gates 171 and 172, OR gates 173, and selector circuits 174 to 176. Setting-all circuit 170 can store the instruction code "data" for each externally inputted context into one layer of instruction memory 112 as mentioned above, as well as initialize for each context the instruction code that is temporarily held in instruction memory 112, and overwrite concurrently the instruction code of any context that is temporarily held in instruction memory 112 on the instruction code of any context.

Specifically, AND gate 171 receives the address data "x, y" for selecting at a time one of processor elements 107 of a matrix with X rows and Y columns. Z AND gates 172 receive the output signal from AND gate 171 and the address data "z" of each layer of instruction memory 112.

The output signals from AND gates 172 are input to each layer of the instruction memory 112. The address data "x, y" thus selects one of processor elements 107 of a matrix with X rows and Y columns, and the address data "z" selects one layer of Z layers of instruction memory 112 in processor element 107.

Note, however, that the output signal from AND gate 171, together with the described-above set signal "set", is input to OR gate 173, so that the set signal "set" generated will disable the address data "x, y" and select one layer of instruction memory 112 corresponding to the address data "z" in all processor elements 107.

Z selector circuits 174 each have one input terminal to which each layer of instruction memory 112 connects individually, and the other input terminal to which initial value "def" is inputted through ground. Selector circuit 174 receives externally the described-above address data "z" as a control signal to output, absent the exceptions described below, the instruction code of one layer of instruction memory 112 connected to selector circuit 174.

If, however, selector circuit 174 receives externally the address data "z" of one layer of instruction memory 112 connected to selector circuit 174, it data outputs the initial value "def".

The output signals from these Z selector circuits 174 are inputted to selector circuit 175. The select signal "sel" is also externally inputted to selector circuit 175. Selector circuit 175 selects one layer from Z layers of instruction memory 112 according to the externally-inputted select signal "sel".

The output signal from selector circuit 175, together with the instruction code "data", is inputted to selector circuit 176. The above-described set signal "set" is also externally inputted to selector circuit 176. Selector circuit 176 selects, according to the set signal "set", the externally-inputted instruction code "data" or the instruction code outputted from selector circuit 175, and stores data of the selected instruction code in one layer of instruction memory 112 that is selected as described above.

For example, one of the plurality of contexts can be initialized at once in all the processor elements 107 as follows. With all processor elements 107 selected according to the set signal "set", one layer of instruction memory 112 is selected according to the address data "z".

Selector circuit 174 then outputs the initial value "def" according to the address data "z". If the above-described one layer of instruction memory 112 is selected according to the select signal "sel", selector circuit 175 then selects the initial value "def".

Selector circuit 176 also selects this initial value "def" according to the set signal "set", and stores data of the initial value "def" in the selected one layer of instruction memory 112 as described above. The instruction codes of a particular context can thus be initialized at once in all the processor elements 107.

The last-time predetermined context can be overwritten on the last-time any other context at a time as follows. With all processor elements 107 selected according to the set signal "set", one layer of instruction memory 112 to be overwritten is selected according to the address data "z".

One layer of instruction memory 112 to be overwritten is then selected according to the select signal "sel", so that selector circuit 176 also selects the instruction code of the selected context according to the set signal "set". Selector circuit 176 stores data of the selected instruction code in the one layer of instruction memory 112 that is selected according to the address data "z". The last-time predetermined context can be concurrently overwritten on the last-time of any other context in all processor elements 107.

In the above-described setting-all circuit 170, if the set signal "set" selects selector circuit 175, the externally-input instruction code "data" is disabled. The instruction code "data" can thus be used as a control signal for selector circuit 175 to eliminate the generation of the dedicated select signal "sel".

Note that the above-described examples illustrate that program memory 302 stores data of only one computer program of array-type computer processor 100, and array-type computer processor 100 obtains data of only one computer program from program memory 302 for only one process operation.

While preferred embodiments of the present invention have been described using specific terms, such description is for illustrative purposes only, and it is to be understood that changes and variations may be made without departing from the spirit or scope of the following claims.

What is claimed is:

1. An array-type computer processor including a data-path unit and a state control unit, said data-path unit including a plurality of processor elements and a plurality of switch elements, arranged in a matrix, each of said processor elements performing data processes according to an instruction code in a computer program, said switch elements switching and controlling connections between a plurality of said processor elements according to said instruction code, and said state control unit arranged to sequentially transfer a context of said instruction code for each of said operation states of said data-path unit, according to said instruction code and an inputted event data, comprising:

state-storage means for holding the instruction code of said state control unit for each of a plurality of said computer programs;

context-storage means holding the instruction code of said data-path unit for each of a plurality of computer programs;

event-input means for receiving an input of event data for task switching;

operation-stopping means for stopping, upon input of said event data for task switching, operations of said state control unit and said data-path unit;

stop-obtaining means for obtaining said operation state of said state control unit and said processed data of said data-path unit when stopped;

stop-holding means for temporarily holding said operation state and said processed data that have been obtained, said holding concurrently holding the operation state and processed data for each of a plurality of computer programs;

switch-setting means for reading any of said operation state and said processed data from among the operation state and said processed data concurrently held in said stop-holding means for said said plurality of computer programs, and setting said read operation state and said processed data in said state control unit and said data path unit; and start-output means for outputting event data, for starting the operation, to said state control unit, upon completion of said setting of said operation state and said processed data in said state control unit and said data path unit, wherein said state control unit starts to transfer the operation state set in said state control unit upon inputting said event data for starting the operation.

2. An array-type computer processor according to claim 1, further comprising instruction code-obtaining means for obtaining data of said computer program from an external program memory, wherein said state-storage means and said context-storage means exchangeably and temporarily hold said computer program in which data have been inputted, said switch-setting means assigns, according to said operation state and said processed data in which data have been set, said computer program according to which a process operation is performed by said state control unit and said data-path unit after reading said instruction code.

3. An array-type computer processor according to claim 2, wherein said instruction code-obtaining means obtains data of the instruction codes of a cooperative portion of said operation states of at least one of said computer programs, and the instruction codes of a corresponding portion of said context from said program memory, said state-storage means and said context-storage means temporarily hold, for at least one of a plurality of said computer programs, only a portion of said instruction codes in which data have been inputted, said instruction code-obtaining means obtains said instruction codes of subsequent said operation states and said context and sets said instruction codes in said state control unit and said data-path unit, every time the operation is completed according to the portion of said instruction codes which is temporarily held by said state control unit and data-path unit, said state control unit and said data-path unit, during obtaining and setting said instruction codes of one of a plurality of said computer programs, operate according to an instruction code of any other said computer program which holds data.

4. An array-type computer processor according to claim 3, further comprising:

priority-detection means for detecting priorities of a plurality of said computer programs having said instruction codes only a portion of which are temporarily held by said state-storage means and said context-storage means; and code increasing and decreasing means for increasing and decreasing, among a plurality of said computer programs, according to said priorities, a number of said instruction codes only a portion of which are temporarily held by said state-storage means and said context-storage means.

5. An array-type computer processor according to claim 4, wherein said priority-detection means accumulates a frequency of use which becomes the computer program priority, every time for each portion of said instruction codes of a plurality of said computer programs which are temporarily held by said state-storage means and said context-storage means, and said code increasing and decreasing means preferentially deletes said instruction code that has lower said frequency of use.

6. A multi-tasking, multiple-processing element data processor, comprising:

a program memory for storing instruction code for each of a plurality of computer programs;

a data-path unit having a plurality of processor elements controllably interconnected by a plurality of switch elements, said switch elements switching and controlling connections between a plurality of said processor elements according to said instruction code, each of said processor elements having a plurality of operation states and constructed to switch between said operation states and perform data processes according to said instruction code;

a state control unit to sequentially transfer a context of said instruction code every time for each of said operation states of said data-path unit, according to said instruction code and a properly inputted event data;

event-input means for receiving an input of event data for task switching;

operation-stopping means for stopping, upon input of said event data for said task switching, operations of said state control unit and said data-path unit;

stop-obtaining means for obtaining said operation state of said state control unit and said processed data of said data-path unit when stopped;

stop-holding means for temporarily holding said operation state and said processed data that have been obtained every time for each of a plurality of said computer programs;

switch-setting means for reading said operation state and said processed data of other of said computer programs, from said stop-holding means, upon completion of said temporary holding, and setting said operation state and said processed data in said state control unit and said data-path unit; and start-output means for outputting event data for starting the operation to said state control unit, upon completion of said setting.

7. The data processor of claim 6, further comprising a plurality of said multi-tasking data-processors connected in parallel to perform each of various data processes according to a computer program and event data, wherein at least one of said plurality of said data-processors includes an array-type computer processor and a program memory for storing data of said computer program in the array-type computer processor, said array-type computer processor including a data-path unit and a state control unit, said data-path unit including a plurality of processor elements and a plurality of switch elements, which are arranged in a matrix, said processor element arranged to perform data processes according to an instruction code in computer program for each of a plurality of sequentially transferred operation states, said switch element switching and controlling each of connections between a plurality of said processor elements according to said instruction code, and said state control unit sequentially transferring a context of said instruction code every time for each of said operation states of said data-path unit, according to said instruction code and a properly inputted event data, wherein said array-type computer processor comprises:

state-storage means for holding data of the instruction code of said state control unit for each of a plurality of said computer programs; and context-storage means for holding data of the instruction code of said data-path unit for each of a plurality of said computer programs, wherein at least one of a plurality of said data-processing devices comprises:

event-input means for receiving an input of event data for task switching;

operation-stopping means for stopping, upon input of said event data for said task switching, operations of said state control unit and said data-path unit;

stop-obtaining means for obtaining said operation state of said state control unit and said processed data of said data-path unit when stopped;

stop-holding means for temporarily holding said operation state and said processed data that have been obtained every time for each of a plurality of said computer programs;

switch-setting means for reading data of said operation state and said processed data of any other of said computer programs, from said stop-holding means, upon completion of said temporary holding, and setting data of said operation state and said processed data in said state control unit and said data-path unit; and start-output means for outputting event data for starting the operation to said state control unit, upon completion of said setting of data, wherein the state control unit in said array-type computer processor starts, upon input of said event data for starting the operation, to sequentially transfer said operation state.

8. A data-processing system including an array-type computer processor and a program memory which are connected to each other, for storing data a computer program in said array-type computer processor, said array-type computer processor including a data-path unit and a state control unit, said data-path unit including a plurality of processor elements and a plurality of switch elements, which are arranged in a matrix, said processor element performing each of data processes according to an instruction code, said switch element switching and controlling each of connections between a plurality of said processor elements according to said instruction code, and said state control unit sequentially transferring a context of said instruction code every time for each of said operation states of said data-path unit, according to said instruction code and an inputted event data, wherein said program memory stores data of a plurality of said computer programs, and said array-type computer processor comprises:

state-storage means for holding data of the instruction code of said state control unit for each of a plurality of said computer programs; and context-storage means for holding data of the instruction code of said data-path unit for each of a plurality of said computer programs, wherein said array-type computer processor includes a task-switching circuit connected thereto, and wherein the task-switching circuit comprises:

event-input means for receiving an input of event data for task switching;

operation-stopping means for stopping, upon input of said event data for task switching, the operations of said state control unit and said data-path unit;

stop-obtaining means for obtaining said operation state of said state control unit and said processed data of said data-path unit when stopped;

stop-holding means for temporarily and concurrently holding said operation state and said processed data that have been obtained for each of a plurality of said computer programs;

switch-setting means for reading any of said operation state and said processed data from among the operation state and said processed data concurrently held in said stop-holding means for said plurality of said computer programs, and setting data of said operation state and said processed data in said state control unit and said data-path unit; and start-output means for outputting event data for starting the operation to said state control unit, upon completion of said setting of data, wherein the state control unit in said array-type computer processor starts, upon input of said event data for starting the operation, to sequentially transfer said operation state.

9. A multi-tasking array-type computer processor having an array of software configurable processing units and an array of software configurable switches to selectively interconnect said processing units, comprising:

a state control unit having a multi-program storage means for storing a plurality of programs, each program having a corresponding plurality of contexts, each of said contexts having a processor instruction code and a switch instruction code defining a configuration state of said array of software configurable processing units and a configuration state of said array of software configurable switches, means for selecting a program from among said plurality of programs and for sequentially outputting the contexts corresponding to the selected program;

means for detecting an intermediate processing result of said array of software configurable processors;

means for detecting a given event for switching from one of said programs to another of said programs, and for generating a task switching data in response to said detecting;

means for storing, in response to said task switching data, said detected intermediate processing result, in a storage location corresponding to the program having the context associated with said intermediate processing result;

means for retrieving said stored intermediate processing result;

means for setting a processing state of array of processing units in accordance with said retrieved intermediate processing result; and means for detecting a completion of said setting and for generating a start event data in response, wherein said state control unit, in response to said start event data, selects the program having the context associated with the intermediate processing state, and sequentially transfers contexts associated with the selected program in a sequence starting with the context associated with said intermediate processing result.

10. The multi-tasking array-type computer processor of claim 9, further comprising:

means for detecting a completion of said storing said detected intermediate processing result, and for generating a completion data in response, wherein, in response to said completion data, said means for selecting from among said plurality of programs selects another of said programs and sequentially outputs the contexts corresponding to said another selected program.

11. The multi-tasking array-type computer processor of claim 10, wherein said means for storing said detected intermediate processing result, in response to said task switching data being substantially concurrent with said state control unit outputting the contexts corresponding to said another selected program, stores said detected intermediate processing result in a storage location corresponding to said another selected program.

12. The multi-tasking array-type computer processor of claim 11, wherein said means for detecting a completion further detects a completion of said storing said detected intermediate processing result in a storage location corresponding to said another completion data and, in response, generates another completion data, wherein, in response to said another completion data, said means for selecting from among said plurality of programs selects another of said programs and sequentially outputs the contexts corresponding to said still another selected program, wherein said means for storing said intermediate processing result concurrently stores the processing result associated with a context of a first of said programs and the processing result associated with a context of a second of said programs, wherein means for retrieving said stored intermediate processing result selects between and retrieves the processing result associated with the context of the first of said programs and the processing result associated with the context of the second of said programs.

13. The multi-tasking array-type computer processor of claim 12, wherein at least one of said first and second programs has a priority data and wherein said means for retrieving said stored intermediate processing result selects between and retrieves the processing result associated with the context of the first of said programs and the processing result associated with the context of the second of said programs based on said priority data.

14. A multi-tasking array-type computer processor comprising:
- a state control unit having
  - a multi-program storage means for storing a plurality of programs, each program having a corresponding plurality of contexts, each of said contexts having a processor instruction code and a switch instruction code, and
  - means for selecting from among said plurality of programs and for sequentially outputting the contexts corresponding to the selected program;
- a data-path unit, having
  - a plurality of processor units, each processor unit having means for receiving said output contexts, a plurality of operating states, circuitry for transitioning from one of said operating states to another of said operation states based on the processor instruction code of said received contexts, and circuitry for operating on a data based on the processor instruction code of said received contexts and for generating a processed data in response, and
  - a plurality of switching elements for selectively establishing connection states among the data receiving ports and data ports of said processor units, based on the switch instruction code of said received contexts,
  - wherein said data-path unit generates a collective processed data based on said processor units' generated processed data;
- means for detecting a given kind of task switching event representing a given condition for switching from one of said programs to another of said programs, and for generating a task switching data in response to said detecting;
- means for stopping operations of said state control unit and said data-path unit in response to said task switching data;
- means for detecting an operation state of said state control unit and detecting said collective processed data of said data-path unit when stopped, wherein said operation state identifies which of said programs' contexts are being sequentially output when stopped;
- means for retrievably storing said detected operation state of said state control unit and said detected collective processed data;
- means for reading said stored detected operation state and said stored collective processed data;
- means for setting the operation state of said state control unit and the processed data in said data-path unit in accordance with the read detected operation state and collective processed data; and
- means for detecting a completion of said setting the operation state of said state control unit and the processed data in said data-path unit and, in response, outputting a start event data,
- wherein said state control unit, in response to said task switching data, switches from outputting one of said programs' associated contexts to outputting another of said programs' associated contexts, and
- wherein said state control unit, in response to said start event data, switches from outputting said another of said programs' associated contexts to outputting said one of said programs' associated contexts.

* * * * *